3,242,178
2,4-DIAMINO-6-HYDROXYMETHYL-7,8-DIHYDROPTERIDINE
Gertrude B. Elion, Bronxville, N.Y., assignor to Burroughs Wellcome & Co. (U.S.A.) Inc., Tuckahoe, N.Y., a corporation of New York
No Drawing. Filed Aug. 20, 1963, Ser. No. 303,399
1 Claim. (Cl. 260—251.5)

This invention relates to 2,4-diamino-6-hydroxymethyl-7,8-dihydropteridine.

This compound has been found to inhibit the biochemical synthesis of p-2-amino-4-hydroxypteridin-6-yl-methylaminobenzoylglutamic acid (folic acid), whereas 2,4-diamino-6-hydroxymethylpteridine and 2,4-diamino-6-hydroxymethyl-5,6,7,8-tetrahydropteridine do not.

This discovery is illustrated by the following table, which shows the amounts of folic acid ($\mu$g.) synthesised by an acetone powder of *Lactobacillus arabinosus* from 2-amino-4-hydroxy-6-hydroxymethyl - 7,8 - dihydropteridine (6 $\mu$g.) and p-aminobenzoylglutamic acid (60 $\mu$g.) in the presence of given amounts of inhibitor ($\mu$g.).

| Inhibitor | 0 | 2 | 6 | 20 |
|---|---|---|---|---|
| 2,4-diamino-6-hydroxymethylpteridine | 1.30 | 1.05 | 1.65 | 1.80 |
| 2,4-diamino-6-hydroxymethyl-7,8-dihydropteridine | 1.30 | 1.15 | 0.92 | 0.695 |
| 2,4-diamino-6-hydroxymethyl-5,6,7,8-tetrahydropteridine | 1.30 | 1.75 | 1.90 | 1.60 |

For this purpose, the compound is used as a pharmaceutical formulation. It may advantageously be presented in discrete units, such as tablets, capsules, cachets, ampoules or suppositories each containing a predetermined about of the compound. It may also be presented as a powder or granules, as a solution or suspension in an aqueous, non-aqueous or emulsified liquid, or as an ointment. For parenteral use, the formulations must be sterile and are presented in sealed containers. The formulations may be made by any of the methods or pharmacy, and may include one or more of the following accessory ingredients: diluents; solutes; buffers; flavouring, binding, dispersing, surface-active, thickening, lubricating, and coating materials; preservatives; antioxidants; bacteriostats; suppository and ointment bases; and any other acceptable excipients.

2,4-diamino-6-hydroxymethyl - 7,8 - dihydropteridine may be produced by the partial reduction of 2,4-diamino-6-hydroxymethylpteridine. For this purpose, catalytic hydrogenation or systems generating nascent hydrogen may be used.

The following example is illustrative.

*Example*

Sodium dithionite (870 mg.) and 2-mercaptoethanol (2 ml.) were added with stirring to a solution of 2,4-diamino-6-hydroxymethylpteridine (500 mg.) in hot water (250 ml.). After approximately 5 minutes of heating, the ultraviolet absorption spectrum of the mixture indicated that reduction has occurred. Addition of further sodium dithionite (220 mg.) to the reaction mixture produced no further change in the spectrum. The reaction mixture was chilled and the initial precipitate was removed by filtration. On standing the solution for 24 hours at 0° C., 2,4-diamino-6-hydroxymethyl - 7,8 - dihydropteridine precipitated and was collected by filtration. Its ultraviolet absorption spectrum has a maximum at 288 m$\mu$ and an inflexion at 320 m$\mu$ at pH 1, and a maximum at 288 m$\mu$ and an inflexion at 315 m$\mu$ at pH 11.

What I claim is:
2,4-diamino-6-hydroxymethyl-7,8-dihydropteridine.

References Cited by the Examiner
UNITED STATES PATENTS
2,667,485   1/1954   Petering _____ 260—251.5

NICHOLAS S. RIZZO, *Primary Examiner.*